United States Patent
Song et al.

(10) Patent No.: US 9,256,289 B2
(45) Date of Patent: Feb. 9, 2016

(54) METHOD AND APPARATUS FOR DISPLAYING A POLYHEDRAL USER INTERFACE

(75) Inventors: Byung-youn Song, Suwon-si (KR); Nag-eui Choi, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 84 days.

(21) Appl. No.: 13/569,655

(22) Filed: Aug. 8, 2012

(65) Prior Publication Data

US 2013/0132909 A1    May 23, 2013

(30) Foreign Application Priority Data

Nov. 22, 2011  (KR) .................. 10-2011-0122393

(51) Int. Cl.
*G06F 3/0482* (2013.01)
*G06F 3/01* (2006.01)
*G06F 3/0481* (2013.01)
*G06F 3/0346* (2013.01)

(52) U.S. Cl.
CPC .............. *G06F 3/017* (2013.01); *G06F 3/0346* (2013.01); *G06F 3/04815* (2013.01); *G06F 2203/04802* (2013.01)

(58) Field of Classification Search
CPC ................. G06F 2203/04802; G06F 3/04815
USPC ........................................................ 715/848
See application file for complete search history.

(56) References Cited

U.S. PATENT DOCUMENTS

| | | | | |
|---|---|---|---|---|
| 6,072,467 A | * | 6/2000 | Walker ........................... | 345/157 |
| 7,216,305 B1 | * | 5/2007 | Jaeger ................... | G06F 3/0481 345/419 |
| 8,271,898 B1 | * | 9/2012 | Mattos ................. | G06F 3/0485 345/473 |
| 2001/0003835 A1 | * | 6/2001 | Watts ..................... | G06F 1/3203 719/318 |
| 2003/0156146 A1 | * | 8/2003 | Suomela ............... | G06F 3/0481 715/864 |
| 2006/0020888 A1 | * | 1/2006 | Kang .................. | G06F 3/04815 715/708 |
| 2006/0020898 A1 | * | 1/2006 | Kim .................... | G06F 3/04815 715/764 |
| 2006/0274060 A1 | | 12/2006 | Ni et al. | |
| 2009/0280863 A1 | * | 11/2009 | Shin ...................... | G06F 1/1624 455/557 |

(Continued)

FOREIGN PATENT DOCUMENTS

| | | |
|---|---|---|
| KR | 10-2005-0098468 A | 10/2005 |
| KR | 10-2010-0122461   | 11/2010 |
| KR | 10-2011-0000354 A | 1/2011  |

OTHER PUBLICATIONS

Puffgames.com, 3d rubiks kube puzzle, avialable Feb. 4, 2014, screenshots taken by Examiner on Apr. 17, 2015, http://web.archive.org/web/20100607224036/http://www.puffgames.com/3d_rubiks_kube_puzzle/.*

(Continued)

*Primary Examiner* — Reza Nabi
*Assistant Examiner* — Daniel Rodriguez
(74) *Attorney, Agent, or Firm* — NSIP Law (57) ABSTRACT

Provided is a method and apparatus for providing a three-dimensional (3D) polyhedral user interface. A first polyhedron may be formed of a plurality of blocks which are mapped with a plurality of pieces of information. A user may manipulate rotation of some of the blocks to generate a second polyhedron.

18 Claims, 7 Drawing Sheets

(56) References Cited

U.S. PATENT DOCUMENTS

| | | | |
|---|---|---|---|
| 2010/0164993 A1* | 7/2010 | Yoshida | G06F 3/0346 345/650 |
| 2010/0169836 A1* | 7/2010 | Stallings et al. | 715/848 |
| 2010/0241993 A1* | 9/2010 | Chae | G01C 21/3611 715/830 |
| 2010/0253619 A1* | 10/2010 | Ahn | 345/157 |
| 2011/0065478 A1* | 3/2011 | Kim et al. | 455/566 |
| 2011/0307834 A1* | 12/2011 | Wu | 715/836 |
| 2013/0154811 A1* | 6/2013 | Ferren | G06K 9/3266 340/12.5 |
| 2014/0129990 A1* | 5/2014 | Xin | G06K 9/6201 715/849 |

OTHER PUBLICATIONS

Korean Office Action issued Apr. 12, 2013 in counterpart Korean Patent Application No. 10-2011-0122393 (5 pages, in Korean).

\* cited by examiner

|  |  |  | E01 | E02 | E03 |  |  |  |
|---|---|---|---|---|---|---|---|---|
| 130e | | | E04 | E05 | E06 | | | |
| | | | E07 | E08 | E09 | | | |
| A01 | A02 | A03 | B01 | B02 | B03 | C01 | C02 | C03 | D01 | D02 | D03 |
| A04 | A05 | A06 | B04 | B05 | B06 | C04 | C05 | C06 | D04 | D05 | D06 |
| A07 | A08 | A09 | B07 | B08 | B09 | C07 | C08 | C09 | D07 | D08 | D09 |
| 130a | | | 130b | | | F01 | F02 | F03 | 130d | | |
| | | | | | | F04 | F05 | F06 | | | |
| | | | | | 130f | F07 | F08 | F09 | | | |

METHOD AND APPARATUS FOR DISPLAYING A POLYHEDRAL USER INTERFACE

CROSS-REFERENCE TO RELATED APPLICATION(S)

This application claims the benefit under 35 USC §119(a) of Korean Patent Application No. 10-2011-0122393, filed on Nov. 22, 2011, in the Korean Intellectual Property Office, the entire disclosure of which is incorporated herein by reference for all purposes.

BACKGROUND

1. Field

The following description relates to a method and apparatus for displaying a three-dimensional (3D) polyhedral user interface.

2. Description of Related Art

A user interface enables a user to smoothly use digital devices. Recently, smart functions, such as the Internet, games, and social networking services (SNSs), have been included in digital devices, such as Blu-ray players, multimedia players, and set-top boxes. Accordingly, it is desirable for a user interface for manipulating such digital devices to be able to receive various inputs.

A graphic user interface is used to quickly and intuitionally transmit information to a user. In the graphic user interface, the user may move a pointer by using a unit, such as a keypad, a keyboard, a mouse, and a touch screen, to select an object covered by the pointer to command the digital device to perform a desired operation.

SUMMARY

In an aspect, there is provided a method for displaying a polyhedral graphical user interface, the method including generating a first polyhedron comprising a plurality of blocks, the plurality of blocks being mapped with a plurality of pieces of information, displaying the first polyhedron as a graphical user interface, rotating one or more of the blocks from among the plurality of blocks, and displaying a second polyhedron as a graphical user interface which corresponds to the first polyhedron after rotating the one or more blocks.

The first and second polyhedrons may be a hexahedron, a square pillar, a hexagonal pillar, a regular tetrahedron, or a regular octahedron.

The plurality of blocks may be arranged in a matrix of n rows and n columns on each surface of the first and second polyhedrons, where n is a natural number equal to or greater than 2.

The plurality of pieces of information may be mapped to an outer surface of each of the plurality of blocks on the first polyhedron in a one-to-one manner.

The plurality of pieces of information mapped to the surface of the plurality of blocks may rotate along with the rotation of the one or more blocks.

The rotating of the one or more blocks may comprise rotating blocks in a plane including a block pointed to by a pointer and blocks that are on a dragging direction of the pointer.

The method may further comprise rotating the second polyhedron.

The second polyhedron may be rotated in a dragging direction of a pointer, in response to the pointer being dragged while being placed outside the second polyhedron.

The method may further comprise resetting the second polyhedron back to the first polyhedron.

The resetting may be performed in response to detecting that a remote controller is continuously moved in a predetermined pattern.

A pointer displayed on a display unit may move according to a movement of a remote controller.

In an aspect, there is provided an apparatus for displaying a polyhedral graphical user interface, the apparatus including a display unit configured to display a first polyhedron as a graphical user interface comprising a plurality of blocks mapped with a plurality of pieces of information, and a user interface controller configured to generate a second polyhedron by rotating one or more of the blocks from among the plurality of blocks, and to display the second polyhedron on the display unit as a graphical user interface.

The first and second polyhedrons may be a hexahedron, a square pillar, a hexagonal pillar, a regular tetrahedron, or a regular octahedron.

The apparatus may further comprise a communication module configured to receive a selection of a user to rotate a block, wherein the user interface controller rotates blocks in a plane including the selected block and blocks placed on a rotation direction of the selected block.

The user interface controller may rotate blocks in a plane including a block pointed to by a pointer and blocks placed on a dragging direction of the pointer.

The user interface controller may rotate the first polyhedron in a dragging direction of a pointer in response to the pointer being dragged outside the first polyhedron, or rotate the second polyhedron in a dragging direction of the pointer in response to the pointer being dragged outside the second polyhedron.

The user interface controller may reset the generated second polyhedron back to the first polyhedron, in response to detecting that a remote controller moves in a predetermined pattern.

The apparatus may further comprise a remote controller configured to generate a control command to control a movement of a pointer displayed on the display unit.

The remote controller may comprise a motion sensor for detecting a self-movement, and the user interface controller moves the pointer on the display unit according to the movement of the remote controller.

In an aspect, there is provided a computer-readable storage medium having recorded thereon a program for executing a method for displaying a polyhedral graphical user interface, the method including generating a first polyhedron comprising a plurality of blocks, the plurality of blocks being mapped with a plurality of pieces of information, displaying the first polyhedron as a graphical user interface, rotating one or more blocks from among the plurality of blocks, and displaying a second polyhedron as a graphical user interface which corresponds to the first polyhedron after rotating the one or more blocks.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
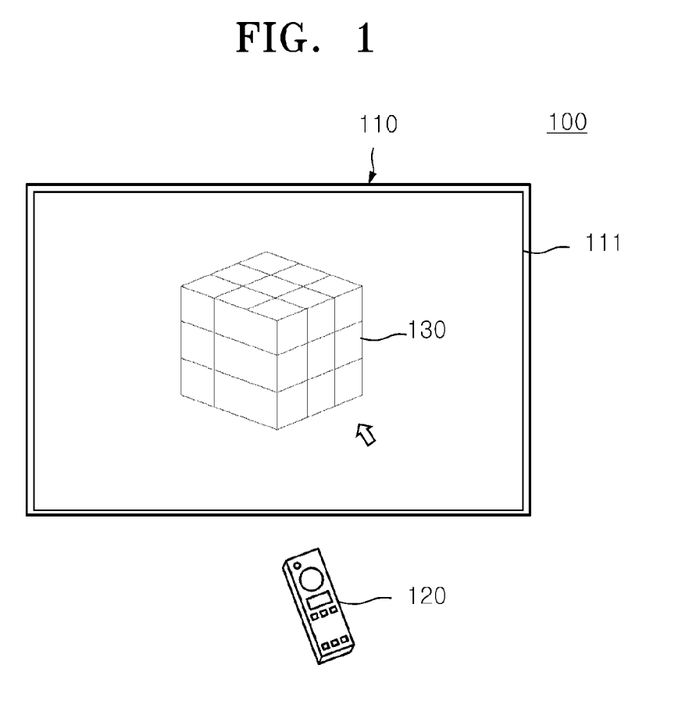
FIG. 1 is a diagram illustrating an example of a multimedia device.
Figure 2:
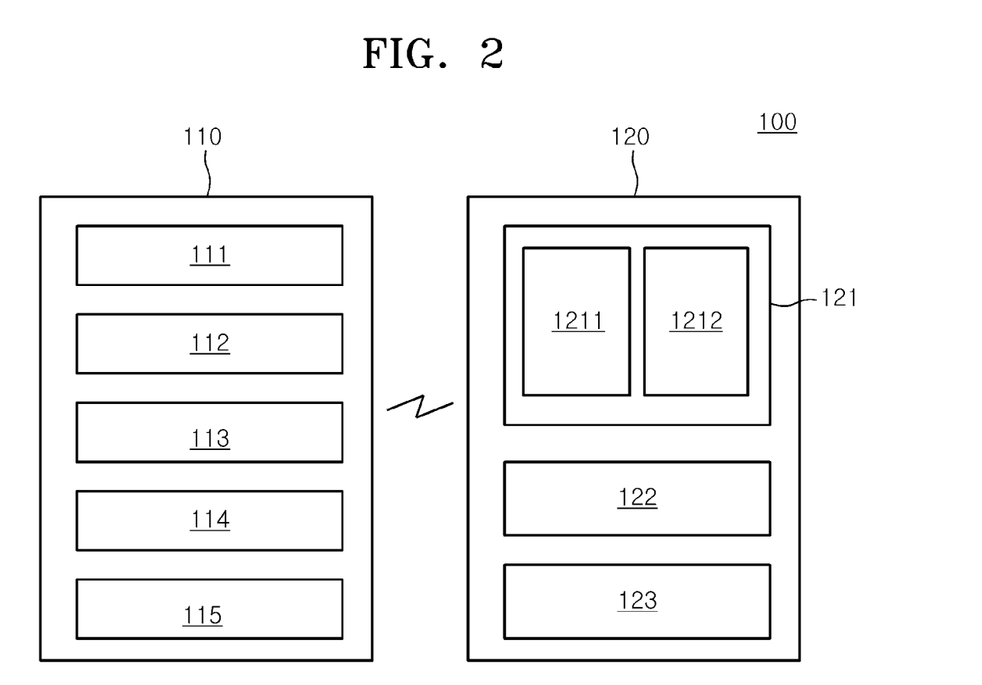
FIG. 2 is a diagram illustrating an example of the components that may be included in the multimedia device of FIG. 1.

FIG. 1 illustrates an example of a multimedia device 100 and FIG. 2 illustrates an example of the components that may be included in the multimedia device 100.

Referring to FIGS. 1 and 2, the multimedia device 100 includes a body 110 and a remote controller 120 for controlling the body 110.

The body 110 includes a display unit 111, a data input unit 112 for receiving data from outside the multimedia device 100, a signal processor 113 for processing data, a host communicator 114 that communicates with the remote controller 120, and a user interface controller 115. As a non-limiting example, the body 110 may be a smart television (TV) that not only broadcasts public broadcasts and cable broadcasts, but also executes various executable programs, such as internet connection.

A smart TV may include an operating system (OS) installed therein and an internet connection function in a digital TV, and thus, not only real-time broadcasts, but also various contents, such as video on demand (VOD), games, searches, convergence service, intelligent service, and the like, may be provided in a user environment (user interface (Up/user experience (UX)). As another example, the display unit 111 may be installed outside a device as a separate unit. For example, the body may be a terminal such as a smart phone, a tablet, a television, an appliance, a Blu-ray player, a multimedia player, a set-top box, a personal computer, a game console, and the like.

The display unit 111 may include an image panel, such as a liquid crystal panel or an organic light-emitting panel to display content. In the example of FIG. 1, the displayed content includes a first polyhedral object 130 of a three-dimensional (3D) polyhedral user interface. As another example, the displayed content may include another shaped polyhedral object in three-dimensions, a two-dimensional (2D) object, a moving image, text, and the like. The display unit 111 may be a two-dimensional display and/or a three-dimensional display. The polyhedral object may be displayed in three-dimensions. As another example, the polyhedral object may be displayed as a three-dimensional object in a two-dimensional display.

The data input unit 112 is an interface for receiving data, such as content displayed on the display unit 111. The data input unit 112 may include at least one of a universal serial bus (USB), parallel advanced technology attachment (PATA) or serial advanced technology attachment (SATA), a flash media, Ethernet, Wi-Fi, BLUETOOTH®, and the like. In some examples, the body 110 may include an information storage device (not shown), such as an optical disk drive or a hard disk, to receive data therethrough.

The signal processor 113 may decode and process data that is input through the data input unit 112. The host communicator 114 may receive a control command from the remote controller 120. For example, the host communicator 114 may be a communication module such as an infrared ray communication module, a radio communication module, an optical communication module, and the like. For example, the host communicator 114 may include an infrared ray communication module satisfying an infrared data association (IrDA) protocol constituting the infrared ray communication standard. Alternatively, the host communicator 114 may include a communication module using a frequency of 2.4 GHz or using BLUETOOTH®.

The user interface controller 115 may provide a 3D polyhedral user interface based on an OS of the body 110. An example of a 3D polyhedral user interface provided by the user interface controller 115 is described below.

Referring again to FIG. 2, the remote controller 120 includes an input unit 121, a control signal generator 122, and a controller communicator 123. An outer shape of the remote controller 120 is not limited to that shown in FIG. 1.

The input unit 121 includes a direction input unit 1211 and an enter button 1212. For example, the direction input unit 1211 may include a motion sensor that detects a movement of the remote controller 120, such as a biaxial or triaxial inertial sensor. The motion sensor may be installed inside the remote controller 120. The direction input unit 1211 may be used to point to an object from among objects displayed on the display unit 111 of the body 110. A user may manipulate the point on the display unit 111 by manipulating the direction input unit 1211 of the remote controller 120.

The enter button 1212 may include a mechanical key button, a touch sensor, and the like. The enter button 1212 may be used to activate or execute an object selected on the display unit 111 of the body 110 by receiving manipulation from the user, such as the user pressing the enter button 1212.

The input unit 121 may further include keys that the user frequently uses. For example, the body 110 may include a power key for turning on/off a power supply, a home button for returning to a main user interface screen, a back button for returning to a previous user interface screen, and the like. As another example, the input unit 121 may include player exclusive keys, such as a reward button, a play button, a forward button, and the like.

The control signal generator 122 may generate a control command corresponding to signals generated by the input unit 121. The controller communicator 123 may transmit the control command generated by the control signal generator 122 to the body 110. For example, the controller communicator 123 may correspond to the host communicator 114, and may be a communication module, such as an infrared ray communication module, a radio communication module, an optical communication module, and the like.

Examples of the 3D polyhedral user interface provided by the user interface controller 115 are further described herein.

Figure 3:
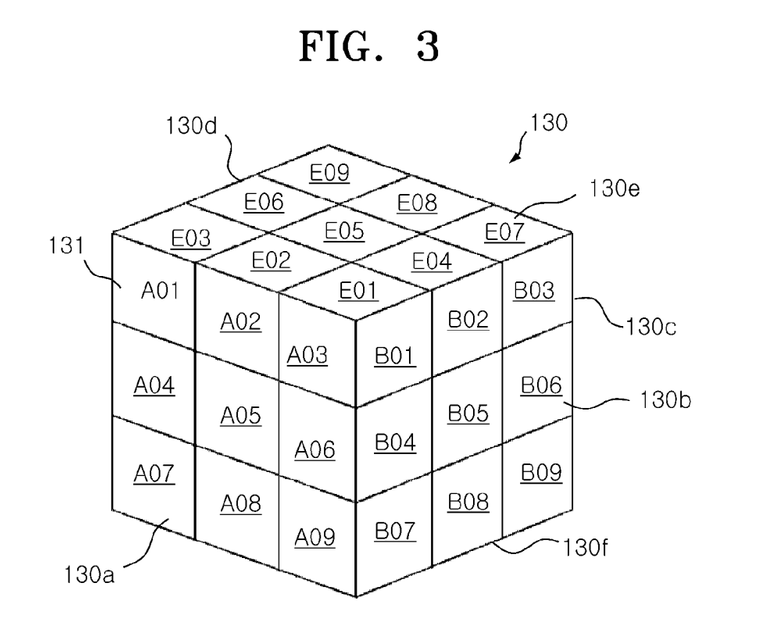
FIG. 3 is a diagram illustrating an example of a first polyhedral object displayed on a display unit of the multimedia device of FIG. 1.
Figure 4:
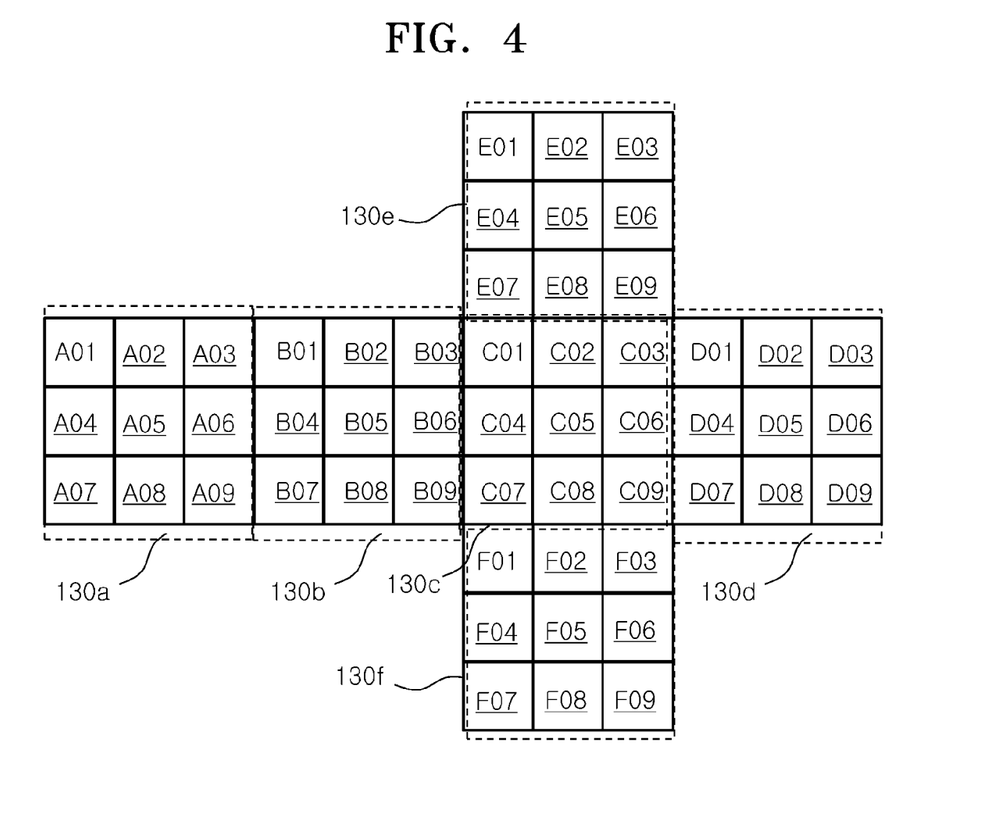
FIG. 4 is a diagram illustrating an example of a plan view of surfaces of the first polyhedral object of FIG. 3.

FIG. 3 illustrates an example of the first polyhedral object 130 of the 3D polyhedral user interface displayed on the display unit 111 of the multimedia device 100 of FIG. 1, and FIG. 4 illustrates an example of first through sixth surfaces 130a through 130f of the first polyhedral object 130 of FIG. 3.

Referring to FIGS. 3 and 4, the first polyhedral object 130 has a hexahedron shape formed of a plurality of blocks 131. Each of the blocks 131 also has a smaller hexahedron shape. Looking at the first through sixth surfaces 130a through 130f of the first polyhedral object 130, the blocks 131 are arranged in three rows and three columns, i.e., in a 3×3 matrix.

A plurality of pieces of information A01 through F09 are mapped to outer surfaces of the blocks 131 of each of the first through sixth surfaces 130a through 130f of the first polyhedral object 130 in a one-to-one manner. Here, the outer surfaces of the blocks 131 denote externally exposed surfaces forming the first through sixth surfaces 130a through 130f of the first polyhedral object 130. The information A01 through F09 may include information about contents, such as menu items, moving picture images, documents controllable by a user, and the like. In some examples, a part of the information A01 through F09 may be null information.

In the first polyhedral object 130, the information A01 through F09 may be classified according to categories. For example, information in the same category may be arranged on the same surface. As an example, configuration information A01 through A09 may be gathered on the first surface 130a of the first polyhedral object 130. As another example, package media information B01 through B09, such as music, pictures, and moving images, may be gathered on the second surface 130b of the first polyhedral object 130. As another example, social network executable program information C01 through C09 may be gathered on the third surface 130c of the first polyhedral object 130. As another example, internet content information D01 through D09 may be gathered in the fourth surface 130d of the first polyhedral object 130. As another example, channel information E01 through E09 of terrestrial broadcasts may be gathered on the fifth surface 130e of the first polyhedral object 130, and various game executable program information F01 through F09 may be gathered on the sixth surface 130f of the first polyhedral object 130.

Figure 5:
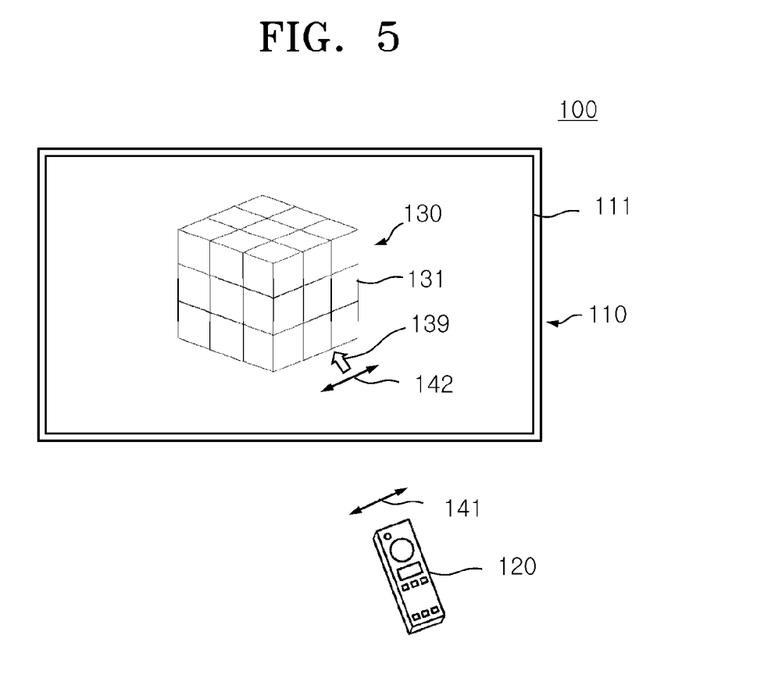
FIG. 5 is a diagram illustrating an example of a first polyhedral user interface that may be manipulated by a user using a remote controller.

FIG. 5 illustrates an example of a first polyhedral user interface that may be manipulated by a user using a remote controller.

Referring to FIGS. 2 & 5, if the remote controller 120 is moved in space, the direction input unit 1211 of FIG. 2 of the remote controller 120 may detect movement 141 of the remote controller 120, and the control signal generator 122 may generate a control command for directing movement 142 of a pointer 139 corresponding to the movement 141 of the remote controller 120. The control command generated by the remote controller 120 may be input to the user interface controller 150 through the body 110. The user interface controller 115 controls the movement 142 of the pointer 139 based on the received control command. In other words, for example, the user may perform intuitive manipulation by combining the movement 141 caused by a user moving the remote controller 120 in space, and the movement 142 of the pointer 139 displayed on the display unit 111 of FIG. 1.

Figure 6:
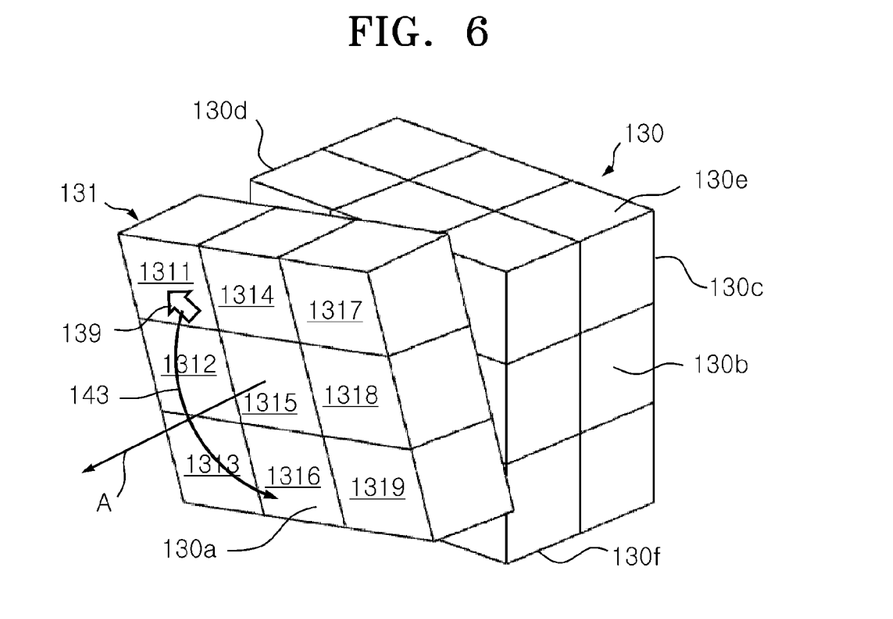
FIG. 6 is a diagram illustrating an example of a user rotating the first polyhedral user interface using the remote controller.
Figure 7:
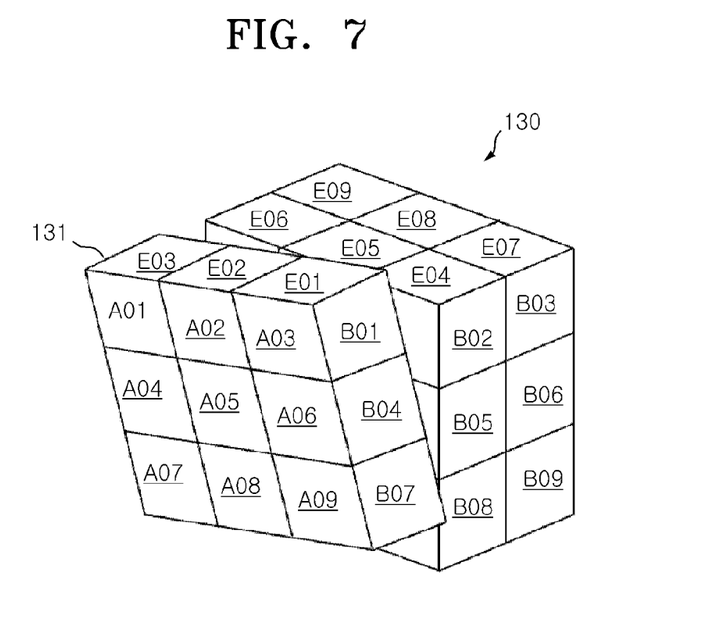
FIG. 7 is a diagram illustrating an example of information mapped on a first polyhedral object which moves during rotation.
Figure 8:
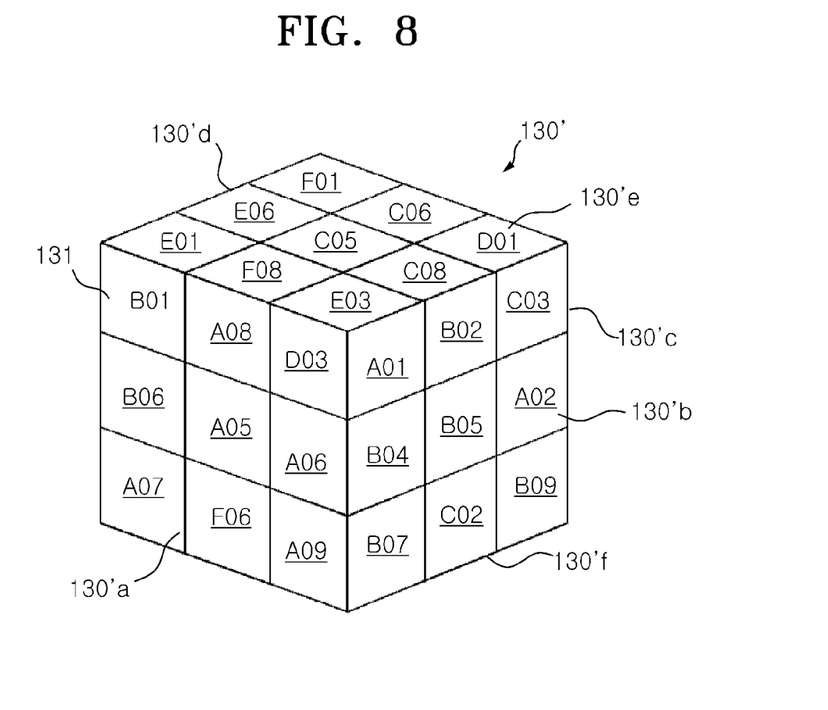
FIG. 8 is a diagram illustrating an example of a second polyhedral object after rotation by a user is completed.

FIG. 6 illustrates an example of a user rotating the first polyhedral object 130 using the remote controller, FIG. 7 illustrates an example of information mapped on the first polyhedral object 130 that moves during the rotation, and FIG. 8 illustrates an example of a second polyhedral object 130' after the rotation manipulation of the first polyhedral object 130 is completed.

Referring to FIG. 6, a block 1311 from among the blocks 131 is selected by the pointer 139, and the selected block 1311 may be dragged based on the user input. For example, the dragging refers to manipulation of dragging and moving the selected block 1311 using the pointer 139 which moves based on manipulation of the remote controller 120 by the user. For example, the selected block 1311 may be dragged while the user of the remote controller 120 continuously pushes the enter button 1212 of FIG. 2 of the remote controller 120 on the selected block 1311. Alternatively, the selected block 1311 may be activated by the user of the remote controller 120 quickly clicking the enter button 1212 and then dragging the selected block 1311 while the selected block 1311 is activated.

When the selected block 1311 is dragged as above, the user interface controller 115 may determine that a rotation command of the selected block 1311 is received, and may determine one or more blocks to be rotated with the selected block 1311. In the example of FIG. 6, nine blocks 1311 through 1319 are placed on the first surface 130a, and block 1311 at one corner extends in the first, fourth, and fifth surfaces 130a, 130d, and 130e. Accordingly, the rotation of block 1311 is performed along with rotation of blocks of any one surface of the first, fourth, and fifth surfaces 130a, 130d, and 130e.

For example, if the user drags the selected block 1311 along a trajectory 143, the user interface controller 115 may determine an initial location of block 1311 and blocks to be rotated based on the dragged trajectory 143. If the user draws the trajectory 143 as an arc that is based on a rotation axis A, the first surface 130a constituting a plane crossing the rotation axis A at right angles and including block 1311 may be determined. Accordingly, in response to the user dragging block 1311 along the trajectory 143, blocks 1311 through 1319 of the first surface 130a rotate at the same time. If block 1311 is dragged in another trajectory and/or in another plane, for example, the fourth surface 130d or the fifth surface 130e including block 1311 may be determined. Accordingly, the blocks rotating at the same time may differ based on the trajectory and the plane in which the pointer is dragged.

The rotation manipulation of the blocks 131 is intuitive because the blocks 131 are rotated through the movement 142 of the pointer 139 displayed on the display unit 111. The movement 142 of the pointer 139 displayed on the display unit 111 is based on the movement 141 of the remote controller 120 in a space. For example, the rotation manipulation of the blocks 131 may be used to manipulate a Rubik's cube type structure.

Referring to FIG. 7, when blocks 131 rotate, the information A01 through F09 rotate along with the blocks 131. As a result, the second polyhedral object 130' is generated based on the rotation manipulation of the blocks 131 of the first polyhedral object 130' as shown in FIG. 8.

Information mapped on first through sixth surfaces 130'a through 130'f of the second polyhedral object 130' has a different arrangement from the information A01 through F09 mapped to the surfaces of the first polyhedral 130. For example, information B01, A08, D03, B06, A05, A06, A07, F06, and A09 on the first surface 130'a may be in different categories as before, and may be selectively gathered by manipulation of the user.

In an example, the polyhedral object 130 may correspond to a Rubik's cube. A user of a Rubik's cube may rotate the blocks 131 of the polyhedral to gather specific information, for example, information B01, A08, D03, B06, A05, A06, A07, F06, and A09, on the first surface 130'a. As such, a 3D polyhedral user interface according to the current example may increase user convenience by gathering preferred information (executable programs, contents, etc.) at one location according to selection of the user, and also provide entertainment elements because of the Rubik's cube. Accordingly, the user may have fun while manipulating the 3D polyhedral user interface.

Figure 9:
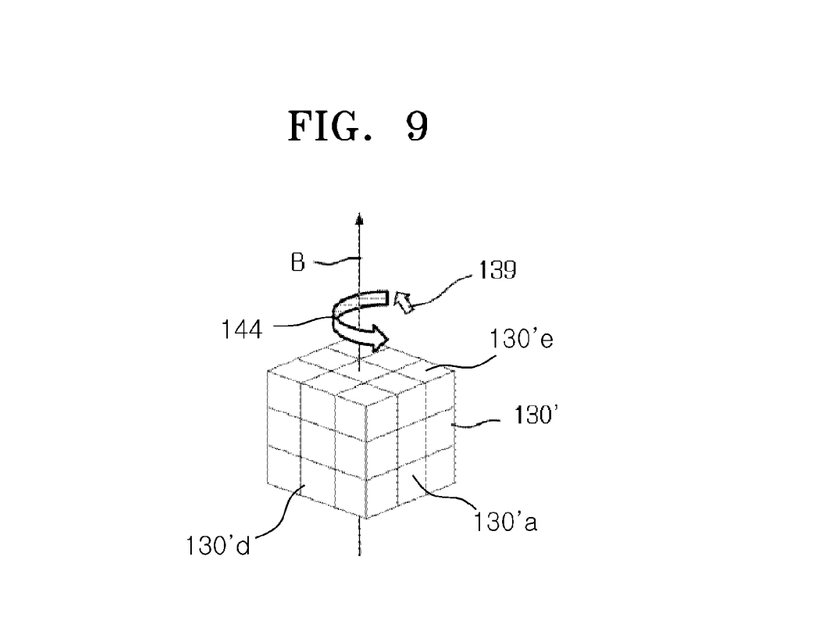
FIG. 9 is a diagram illustrating an example of the rotation of a second polyhedral object.

FIG. 9 illustrates an example of the rotation of the second polyhedral object 130'.

Referring to FIG. 9, the second polyhedral object 130' generated via manipulation of the user may rotate by itself. A surface displayed of the display unit 111 may change as the second polyhedral object 130' rotates. In this example, a rotation command for self-rotation of the second polyhedral object 130' may be performed. For example, by placing the pointer 139 outside the second polyhedral object 130'a and clicking and dragging the pointer 139 as shown in FIG. 9, the second polyhedral object 130' continuously rotate. In this example, a trajectory 144 of dragging the pointer 139 simulates rotation. In response, the user interface controller 115 may interpret movement of the pointer 139 as a self-command of the second polyhedral object 130', and rotate the second polyhedral object 130'. As another example, the rotation command of the second polyhedral object 130' may be displayed as a separate icon on the display unit 111. In this example, if the user clicks the separate icon, the second polyhedral object 130' may rotate.

Figure 10:
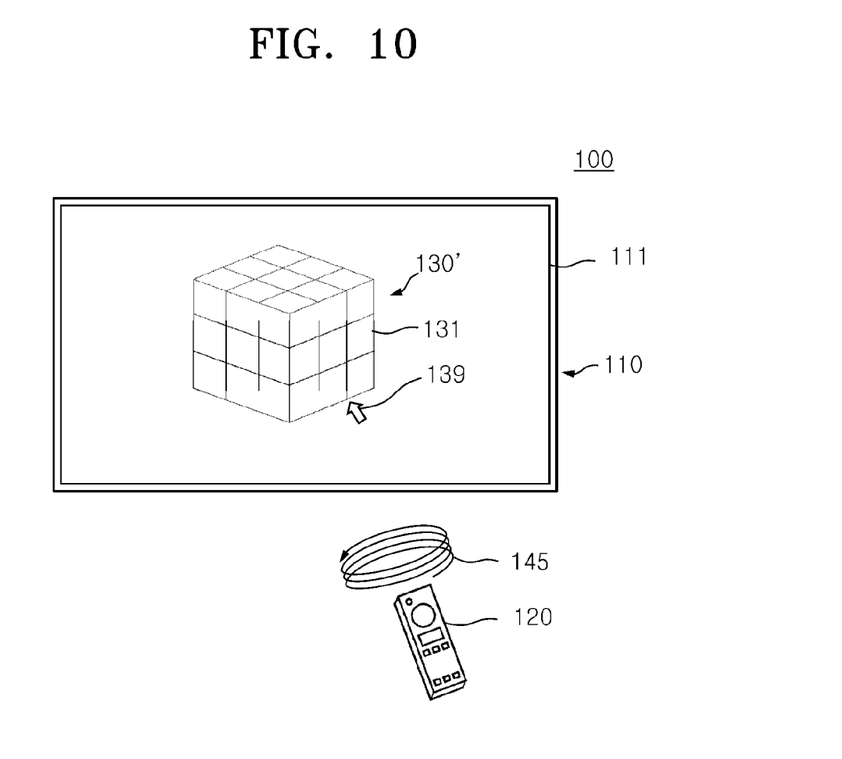
FIG. 10 is a diagram illustrating an example of a user resetting the polyhedral user interface.

FIG. 10 illustrates an example of a user resetting the polyhedral user interface.

By manipulating the rotation of a block, blocks may be mixed and information undesired by the user may be combined as shown in the example of a Rubik's cube. Also, the combination of information in the second polyhedral object 130' may be formed by a particular user, whereas another user may dislike the combination of information in the second polyhedral object 130'. Accordingly, the user interface controller 115 may reset the second polyhedral object 130' back to the first polyhedral object 130 which is a state prior to being rotated.

For example, the reset may be performed by moving the remote controller 120 in a certain pattern. For example, if the user swirls the remote controller 120 a plurality of times, as shown by an arrow 145, the control signal generator 122 may generate a reset command, and the user interface controller 115 may return the second polyhedral object 130' back to the first polyhedral object 130 according to the reset command. As another example, a separate reset button may be provided on the remote controller 120 to perform the reset manipulation by pressing the reset button. As another example, a separate reset icon may be displayed on the display unit 111 of the body 110 to perform the reset manipulation by selecting the reset icon.

Figure 11:
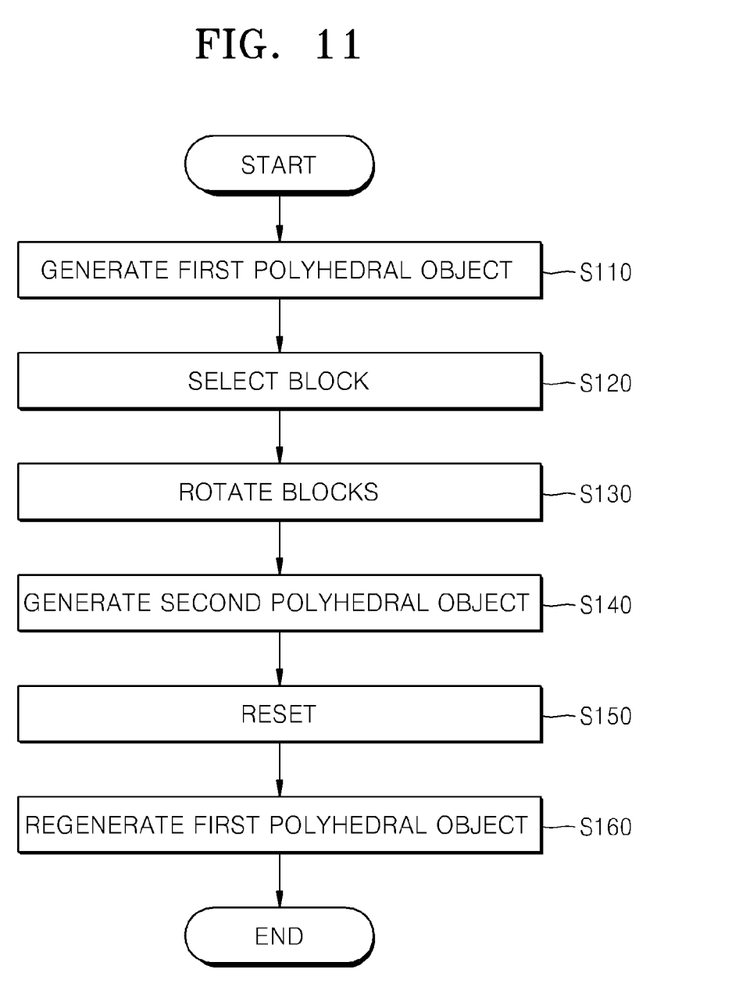
FIG. 11 is a flowchart illustrating an example of a method for displaying a three-dimensional (3D) polyhedral user interface.

FIG. 11 illustrates an example of a method of displaying a 3D polyhedral user interface.

Referring to FIGS. 5 through 11, the user interface controller 115 generates the first polyhedral object 130 and the pointer 139, and displays the first polyhedral object 130 and the pointer 139 on the display unit 111, in operation S110. The user moves the remote controller 120 so that the pointer 139 displayed on the display unit 111 selects a block, for example, block 1311, of the first polyhedral object 130, in operation S120. Then, the user drags the block 1311 to rotate a group of blocks including the block 1311, in operation S130. For example, the group of blocks rotating with the block 1311 may be blocks in a plane which is perpendicular to the rotation axis A and on which the block 1311 is disposed. By rotating the blocks, the second polyhedral object 130' is generated in operation S140. Accordingly, the combination of the information mapped on the first through sixth surfaces 130'a through 130'f of the second polyhedral object 130' may be different from the combination of the information on the first through sixth surfaces 130a through 130f of the first polyhedral object 130.

Further, the user may reset the second polyhedral object 130' in operation S150, thereby returning the second polyhedral object 130' to the first polyhedral object 130 in operation S160.

In the above examples, the first and second polyhedral objects 130 and 130' are hexahedrons, but shapes of the first and second polyhedral objects 130 and 130' are not limited thereto. For example, the first and second polyhedral objects 130 and 130' may have any polyhedral shape, such as a square pillar, a hexagonal pillar, a tetrahedron, an octahedron, and the like. Also, the blocks 131 are arranged in 3 rows and 3 columns, but the arrangement of the blocks 131 is not limited thereto. For example, the blocks 131 may be arranged in a matrix of n rows and m columns on each surface of the first and second polyhedral objects 130 and 130', where n and m are natural numbers equal to or above 2. For example, the blocks 131 may be arranged in 2 rows and 2 columns, 4 rows and 4 columns, or 5 rows and 5 columns on each surface of the first and second polyhedral objects 130 and 130'.

In the above examples, the multimedia device 100 includes the remote controller 120. As another example, the display unit 111 of the multimedia device 100 may include a touch screen for direct input, and in this case, the remote controller 120 may or may not be used.

A user environment (UI/UX) is an important issue for a digital device performing various functions. For example, a smart TV may be used instead of a general TV in a typical home and various functions provided by the smart TV may be more convenient to a user. For example, the smart TV not only provides broadcast content, but also provides various internet-based contents, such as web surfing, e-mails, games, pictures, music, and moving images, which are usable in personal computers. However, if the user dislikes such various contents, the usefulness of the smart TV may decrease.

The various aspects herein may be applied to a multimedia device, such as a smart TV, thereby not only improving user convenience by gathering preferred information (executable programs, contents, etc.) selected by the user, but also entertaining the user in manipulating a 3D polyhedron.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for displaying a polyhedral graphical user interface, the method comprising:
    generating a polyhedron comprising blocks, the blocks being mapped with pieces of information;
    displaying the polyhedron as a graphical user interface;
    displaying a rotation of one or more, but not all, blocks of the polyhedron, while a two-point perspective view of the polyhedron is displayed;
    displaying the polyhedron in its state after rotating the one or more blocks; and
    resetting the rotated blocks of the polyhedron to an original state in response to continuously swirling a remote controller about an axis parallel to a longitudinal axis of the remote controller a predetermined number of times, wherein
    the one or more blocks are rotated about an axis of an arc along which a displayed pointer is dragged.

2. The method of claim 1, wherein the plurality of blocks are arranged in a matrix of n rows and n columns on each surface of the polyhedron, where n is a natural number equal to or greater than 2.

3. The method of claim 1, wherein the plurality of pieces of information are mapped to an outer surface of each of the plurality of blocks on the polyhedron in a one-to-one manner.

4. The method of claim 3, wherein the plurality of pieces of information mapped to the surface of the plurality of blocks rotate along with the rotation of the one or more blocks.

5. The method of claim 1, wherein the rotating of the one or more blocks comprises rotating blocks in a plane including a block pointed to by the pointer and blocks that are on a dragging direction of the pointer.

6. The method of claim 1, further comprising again rotating one or more blocks from among the plurality of blocks of the polyhedron.

7. The method of claim 6, wherein the polyhedron is rotated about an axis of an arc along which the displayed pointer is dragged while placed outside the polyhedron.

8. The method of claim 1, wherein the displayed pointer moves according to a movement of a remote controller.

9. The method of claim 1, further comprising continuously rotating the polyhedron in response to placing the pointer outside the polyhedron and clicking and dragging a pointer.

10. The method of claim 1, further comprising continuously rotating a second polyhedron in response to placing the pointer outside the polyhedron and clicking and dragging a pointer, in response to generating the second polyhedron by a user manipulation of the polyhedron.

11. An apparatus for displaying a polyhedral graphical user interface, the apparatus comprising:
    a display unit configured to display a polyhedron as a graphical user interface comprising blocks mapped with pieces of information; and
    a user interface controller configured to rotate one or more, but not all, of the blocks from among the blocks, wherein:
    the display unit displays a two-point perspective view of the polyhedron as the one or more blocks of the polyhedron are rotated and displays the polyhedron in its state after the completion of the rotation,
    the one or more blocks are rotated about an axis of an arc along which a displayed pointer is dragged; and
    the rotated blocks of the polyhedron are reset to an original state in response to continuously swirling a remote controller about an axis parallel to a longitudinal axis of the remote controller a predetermined number of times.

12. The apparatus of claim 11, further comprising:
    a communication module configured to receive a selection of a user to rotate a block, wherein
    the user interface controller rotates blocks in a plane including the selected block and blocks placed on a rotation direction of the selected block.

13. The apparatus of claim 11, wherein the user interface controller rotates blocks in a plane including a block pointed to by the pointer and blocks placed on a dragging direction of the pointer.

14. The apparatus of claim 11, wherein the user interface controller rotates the polyhedron about an axis of an arc along which the displayed pointer is dragged while placed outside the polyhedron.

15. The apparatus of claim 11, wherein the user interface controller resets a display state of the polyhedron back to a previous display state, in response to detecting that a remote controller moves in a predetermined pattern.

16. The apparatus of claim 11, further comprising a remote controller configured to generate a control command to control a movement of the displayed pointer.

17. The apparatus of claim 16, wherein:
- the remote controller comprises a motion sensor for detecting a self-movement, and
- the user interface controller moves the pointer on the display unit according to the movement of the remote controller.

18. A non-transitory computer-readable storage medium having recorded thereon a program for executing a method for displaying a polyhedral graphical user interface, the method comprising:
- generating a polyhedron comprising blocks, the blocks being mapped with pieces of information;
- displaying the polyhedron as a graphical user interface;
- displaying a rotation of one or more, but not all, blocks of the polyhedron, while a two-point perspective view of the polyhedron is displayed;
- displaying the polyhedron in its state after rotating the one or more blocks; and
- resetting the rotated blocks of the polyhedron to an original state in response to continuously swirling a remote controller about an axis parallel to a longitudinal axis of the remote controller a predetermined number of times, wherein
- the one or more blocks are rotated about an axis of an arc along which a displayed pointer is dragged.

* * * * *